US012638623B2

(12) United States Patent
Schnierle et al.

(10) Patent No.: US 12,638,623 B2
(45) Date of Patent: May 26, 2026

(54) FILTER ASSEMBLY AND METHOD OF MANUFACTURING SAME

(71) Applicants:OroraTech GmbH, Munich (DE); Kampf Telescope Optics GmbH Dirk Kampf, Munich (DE)

(72) Inventors: Patrick Schnierle, Eching (DE); Laura Geismayr, Eching (DE); Dominik Eckert, Munich (DE); Dirk Kampf, Munich (DE)

(73) Assignees: OroraTech GmbH, Munich (DE); Kampf Telescope Optics GmbH Dirk Kampf, Munich (DE)

( * ) Notice: Subject to any disclaimer, the term of this patent is extended or adjusted under 35 U.S.C. 154(b) by 489 days.

(21) Appl. No.: 18/161,258

(22) Filed: Jan. 30, 2023

(65) Prior Publication Data

US 2023/0244015 A1 Aug. 3, 2023

(30) Foreign Application Priority Data

Jan. 31, 2022 (LU) ........................................ 102905

(51) Int. Cl.
*G02B 5/20* (2006.01)
*G02B 7/00* (2021.01)
(52) U.S. Cl.
CPC .............. *G02B 5/20* (2013.01); *G02B 7/006* (2013.01); *G02B 5/208* (2013.01); *G02B 2207/117* (2013.01)
(58) Field of Classification Search
CPC ..... G02B 5/20; G02B 7/006; G02B 2207/117
See application file for complete search history.

(56) References Cited

U.S. PATENT DOCUMENTS

2007/0279779 A1* 12/2007 Milbourne ............. G03B 33/08
359/892
2017/0097489 A1* 4/2017 Sebastian ............... G02B 5/005
(Continued)

FOREIGN PATENT DOCUMENTS

CN 106814523 B * 7/2019 ............. G03B 17/14
CN 214474163 U 10/2021
JP 2012-185374 A 9/2012

OTHER PUBLICATIONS

Luxembourg Search Report and Written Opinion for Application No. LU 102905, dated Aug. 23, 2022, 10 pages.
(Continued)

*Primary Examiner* — Nathanael R Briggs
(74) *Attorney, Agent, or Firm* — Seed Intellectual Property Law Group LLP

(57) ABSTRACT

A filter assembly comprises a planar first optical filter, a planar second optical filter, a frame-shaped base part for accommodating the first and second optical filters, wherein the base part comprises a support part for supporting edge portions of lower surfaces of the first and second optical filters, and a wall part for laterally enclosing at least part of the first and second optical filters, and one or more clamp parts for securing the first and second optical filters against the base part when the first and second optical filters are inserted into the base part, by contacting upper surfaces of the first and second optical filters and pressing the first and second optical filters towards the support part. The disclosure further relates to a method of manufacturing such filter assembly.

17 Claims, 4 Drawing Sheets

(56) References Cited

U.S. PATENT DOCUMENTS

| 2022/0413196 A1 * | 12/2022 | Chen | ...................... A61B 90/39 |
| 2023/0234283 A1 * | 7/2023 | Gmeiner | .............. B29C 64/135 |
| | | | 264/401 |

OTHER PUBLICATIONS

Olivier Scots et al., "LSSTcamera optics design", Proceedings of SPIE, IEEE, US, vol. 8446, Sep. 24, 2012 (Sep. 24, 2012), p. 84466B-1 to 84466B-13.

* cited by examiner

400

S410 — Providing a frame-shaped base part for accommodating the first and second optical filters S420 — Inserting the first and second optical filters into the base part S430 — Providing one or more clamp parts for securing the first and second optical filters against the base part S440 — Fastening the one or more clamp parts to the base part

FILTER ASSEMBLY AND METHOD OF MANUFACTURING SAME

BACKGROUND

Technical Field

This disclosure generally relates to filter assemblies and methods of manufacturing filter assemblies. In particular, the disclosure relates to filter assemblies for use in small satellites (such as CubeSats, for example), especially filter assemblies comprising multiple planar filters that are arranged or arrangeable side by side.

Description of the Related Art

For certain applications such as space-based Earth observation for fire detection, it is desirable to be able to make observations in two or more different spectral bands, for example in the infrared (IR) range. It may further be desirable to perform such observations using a small satellite, such as a CubeSat, for example, with a single optical system. Any such optical system, including filters, shutters, etc., should preferably be able to withstand mechanical loads (such as shock or vibration) during launch of the satellite aboard a launch vehicle.

Existing solutions for larger satellites may involve multi-spectral imaging using beam splitters and individual optical filters, use of optical gratings, or use of filter wheels. However, these solutions are not suitable for use aboard smaller satellites.

On the other hand, integrated solutions that may be applicable to smaller satellites tend to involve filter assemblies with significant complexity and manufacturing cost, typically in excess of 25 k€ per unit. In addition, such filter assemblies may be inflexible in that once they are finalized, changes of the installed optical filters are not possible anymore. Such solutions for filter assemblies suitable for use in small satellites may include Bayer filter arrays or monolithic stick arrays composed of strips of substrate that are glued together, for example.

Thus, there is a need for improved filter assemblies and methods of manufacturing such filter assemblies. There is further need for such filter assemblies that are suitable for use aboard (small) satellites and that can withstand mechanical loads during launch. There is yet further need for such filter assemblies that have reduced complexity and footprint, and that can be manufactured in cost-effective manner.

BRIEF SUMMARY AND INITIAL DESCRIPTION

In view of some or all of these needs, the present disclosure proposes a filter assembly and a method of manufacturing a filter assembly, having the features of the respective independent claims.

An aspect of the disclosure relates to a filter assembly. The filter assembly may be suitable for use with an infrared imaging device and/or for use aboard a (small) satellite, such as a CubeSat, for example. The filter assembly may include a first optical filter and a second optical filter. In some implementations, the filter assembly may include more than two optical filters. The first and second optical filters may be planar filters. Accordingly, the filter assembly may be said to include at least two planar optical filters, among them a first optical filter and a second optical filter. The filter assembly may further include a frame-shaped base part (or mount base part, mount base, mount frame) for accommodating the first and second optical filters. To this end, the base part may include a support part (e.g., planar support part) for supporting edge portions of lower surfaces of the first and second optical filters. "Frame-shaped" in the present context may mean that there is an opening in the support part or that an opening is substantially surrounded by the support part. The first and second optical filters may be inserted into the base part, for example side by side. Further, the base part may include a wall part for laterally enclosing at least part of the first and second optical filters. The filter assembly may yet further include one or more clamp parts for securing the first and second optical filters against the base part when the first and second optical filters are inserted into the base part. The one or more clamp parts may secure the first and second optical filters by contacting upper surfaces of the first and second optical filters and pressing the first and second optical filters towards the support part. The one or more clamp parts may be fixable or otherwise securely attachable to the base part. In some implementations, the one or more clamp parts may be releasably secured to the base part. The base part and/or the one or more clamp parts may be made from aluminum, for example milled from the solid. In general, the base part and/or the one or more clamp parts may be made from a rigid material (e.g., sufficiently rigid material), such as a metal, for example. In other words, the base part and/or the one or more clamp parts may be rigid structural elements, for example.

Configured as described above, the present disclosure provides filter assemblies with a compact yet flexible design. Specifically, the design is adaptable to accommodate for different dimensions, especially different thickness, of optical filters and can be adapted to hold two or more different optical filters. The proposed filter assembly can be used with off-the-shelf optical filters, reducing manufacturing costs and enabling cost-efficient solutions for multi-spectral filtering. In addition, the proposed filter assembly is built from components that can be manufactured at low overall cost, e.g., by milling of the relevant frame and clamp parts from the solid. Finally, since the optical filters are held by clamping instead of gluing or the like, optical filters can be replaced after manufacturing the filter assembly, providing for additional flexibility. In fact, the aforementioned clamping may be sufficient for handling and testing of the filter assembly. Adding glue may only be necessary for a final flight model of the filter assembly.

In some embodiments, the filter assembly may include a (single, monolithic) frame-shaped clamp part with a first pressing portion for pressing the first optical filter towards the support part and a second pressing portion for pressing the second optical filter towards the support part. The first and second pressing portions may be planar pressing portions, for example. Providing a monolithic clamp part further adds to overall stability and shock resistance of the filter assembly and reduces manufacturing complexity.

In some embodiments, the one or more clamp parts may be shaped to accommodate for different thickness of the first and second optical filters. For example, the first and second pressing portions of the frame-shaped clamp part may be offset from each other in a direction perpendicular to the upper (or lower) surfaces of the first and second optical filters when the first and second optical filters are inserted into the base part and pressed by the first and second pressing portions, respectively. It is understood that the first and second optical filters (or the at least two optical filters in general) may have different thickness, in said direction perpendicular to the upper (or lower) surfaces of the first and second optical filters. By this configuration, the filter assembly can be easily adapted to different filter configurations, allowing accommodation of dimensions of various off-the-shelf filters.

In some embodiments, the first and second optical filters may be inserted into (e.g., may lie in) the base part side by side, with one of the lateral surfaces of the first optical filter extending in parallel to and facing one of the lateral surfaces of the second optical filter.

In some embodiments, the filter assembly may further include a grease film provided between the facing lateral surfaces of the first and second optical filters. This grease film may be composed of grease suitable for vacuum. In particular, the grease used for the grease film may not be outgassing. In some implementations, the grease film may also be provided on those portions of the lower surfaces of the first and/or second optical filters that are in contact with the base part (e.g., with the support part of the base part). Providing the grease film between the interface of the first and second optical filters and/or on lower surfaces of the first and second optical filters can improve overall shock resistance of the filter assembly and protect the first and second optical filters from damage.

In some embodiments, the filter assembly may further include a Polyimide layer covering one of the facing lateral surfaces of the first and second optical filters. The Polyimide layer may be a Polyimide film or Polyimide tape, for example. In some implementations, both facing lateral surfaces of the first and second optical filters may be covered by the Polyimide layer. Further, in some implementations the Polyimide layer may cover those portions of the lower surfaces of the first and/or second optical filters that are in contact with the base part (e.g., the support part) and/or those portions of the upper surfaces of the first and/or second optical filters that are in contact with the one or more clamp parts. This is understood to also encompass cases in which the Polyimide layer is provided on the clamp part(s) and/or the base part. Providing the Polyimide layer between the interface of the first and second optical filters and/or at further interfaces can further improve overall shock resistance of the filter assembly and protect the first and second optical filters from damage.

In some embodiments, the wall part may include one or more first through holes. Each first through hole may allow for insertion of a positioning rod, for pressing the one of the first and second optical filters that faces the respective first through hole towards a portion of the wall part opposite the respective first through hole. The first through holes may be arranged on two non-opposite lateral sides of the base part, for example. Thereby, the first and second optical filters may be conveniently and accurately positioned and/or aligned with each other, and/or aligned with target positions required by design.

In some embodiments, the filter assembly may further include one or more end stops arranged at a portion of the wall part opposite the one or more first through holes, for defining a clearance between the portion of the wall part opposite the one or more first through holes and the one of the first and second optical filters that faces said portion of the wall part. For example, the base part may be rectangular, in which case two non-adjacent sides of the four sides of the base part may have first through holes. The two remaining sides may have end stops in this case. The first through holes and end stops may not necessarily have to be in a one-to-one relationship. It may be sufficient that the end stops are provided such as to ensure a well-defined position of the first and/or second optical filters when the optical filters are pressed by the positioning rod(s). Thereby, the first and second optical filters may be conveniently and accurately positioned and/or aligned with each other, and/or aligned with target positions required by design.

In some embodiments, the wall part may include one or more second through holes. Each second through hole may allow insertion of silicon glue into a clearance formed between the one of the first and second optical filters that faces the respective second through hole and a portion of the wall part. For example, the base part may be rectangular, in which case all four of the sides of the base part may have second through holes. In general, the second through holes may be provided on the sides of the base part such that the filters may be additionally secured by silicon glue along their lateral surfaces facing the wall part. By providing the second through holes, and in particular by providing a configuration including first and second through holes as well as end stops, the filters can be conveniently arranged in a pre-defined position and securely fixated in this pre-defined position.

In some embodiments, the filter assembly may further include a Polytetrafluoroethylene, PTFE, layer covering at least those parts of the upper surfaces of the first and second optical filters that are contacted (or to be contacted) by the one or more clamp parts. For example, the PTFE layer may cover those edge parts of the upper surfaces of the first and second optical filters that are adjacent to the wall part. The PTFE layer may be a PTFE film or PTFE tape, for example. The PTFE layer may avoid damage of the first and second optical filters by the clamp part, when being held and pressed by the clamp part.

In some embodiments, the filter assembly may further include a Polyimide layer covering at least those lateral surfaces of the first and second optical filters that are adjacent to portions of the wall part. The Polyimide layer may be a Polyimide film or Polyimide tape, for example. Providing the Polyimide layer may avoid damage of the first and second optical filters, e.g., under vibration or shock.

In some embodiments, the first and second optical filters (or the at least two optical filters in general) may be optically transparent in respective infrared wavelength ranges. The pass-bands of the first and second optical filters (or the at least two optical filters in general) may not be fully over-lapping. For example, the pass bands may not be overlapping at all. The first optical filter may be a mid-wave infrared, MWIR, filter. The second optical filter may be a long-wave infrared, LWIR, filter. However, any combination of different optical filters is feasible in the context of the present disclosure. In general, the at least two optical filters may have different wavelength ranges and/or different thickness, as noted above. By having the proposed configuration, the filter assembly allows for accommodation of all sorts of different optical filters that can be arranged side by side in the base part of the filter assembly and held by the clamp part(s).

In some embodiments, the one or more clamp parts may include through holes for securing the clamp parts against the base part by screws or bolts. The through holes may extend in a direction substantially perpendicular to the upper (or lower) surfaces of the first and second optical filters. The bolts may be riveted bolts, for example. By providing these (vertical) through holes, the clamp part(s) can be securely fixed to the base part, for securing the first and second optical filters and avoiding shifting of the first and second optical filters.

In some embodiments, the base part may further include one or more fixation parts for securing the base part against an external structure. The fixation parts may include (vertical) through holes extending in a direction substantially perpendicular to the upper surfaces of the first and second optical filters, for insertion of screws or bolts (e.g., riveted bolts).

Another aspect of the disclosure relates to a method of manufacturing a filter assembly comprising a (planar) first optical filter and a (planar) second optical filter. The method may include (a step of) providing a frame-shaped base part for accommodating the first and second optical filters. The base part may include a support part for supporting edge portions of lower surfaces of the first and second optical filters and a wall part for laterally enclosing at least part of the first and second optical filters. The method may further include (a step of) inserting the first and second optical filters into the base part. The method may further include (a step of) providing one or more clamp parts for securing the first and second optical filters against the base part, by contacting upper surfaces of the first and second optical filters and pressing the first and second optical filters towards the support part. The method may yet further include (a step of) fastening the one or more clamp parts to the base part.

In some embodiments, the method may further include, before inserting the first and second optical filters into the base part, (a step of) covering a portion of the first and/or second optical filters with a Polyimide film.

In some embodiments, the method may further include, before inserting the first and second optical filters into the base part, (a step of) covering a portion of the first and/or second optical filters with a grease film.

In some embodiments, the method may further include, before inserting the first and second optical filters into the base part, (a step of) covering a portion of the base part with a Polyimide film.

In some embodiments, the method may further include (a step of) covering a portion of the one or more clamp parts with a PTFE film.

In some embodiments, the method may further include, after fastening the one or more clamp parts to the base part, (a step of) inserting silicon glue into a clearance formed between the first and second optical filters and a wall part of the base part, via (horizontal) through holes formed in the wall part.

It should be noted that the methods and systems including the preferred embodiments as outlined in the present disclosure may be used stand-alone or in combination with the other methods and systems disclosed in this document. Furthermore, all aspects of the methods and devices outlined in the present disclosure may be arbitrarily combined. In particular, the features of the claims may be combined with one another in an arbitrary manner.

It will be appreciated that device features and method steps may be interchanged in many ways. In particular, the details of the disclosed filter assembly can be realized by the corresponding manufacturing method, and vice versa, as the skilled person will appreciate. Moreover, any of the above statements made with respect to the filter assembly (and, e.g., its parts, elements, etc.) are understood to likewise apply to the corresponding manufacturing method (and, e.g., its steps), and vice versa.

BRIEF DESCRIPTION OF THE SEVERAL VIEWS OF THE DRAWINGS

Example embodiments of the disclosure are explained below with reference to the accompanying drawings, wherein.

DETAILED DESCRIPTION

In the following, example embodiments of the disclosure will be described with reference to the appended figures. Identical elements in the figures may be indicated by identical reference numbers, and repeated description thereof may be omitted.

The present disclosure aims at providing (optical) filter assemblies for making space-based observations in two or more different spectral bands, for example in the infrared (IR) range. As such, these filter assemblies should be suitable for use with an IR imaging system, for example. In addition, these filter assemblies should be compact, simple, and allow for use of optical filters that can be bought off-the-shelf and only need to be cut to appropriate dimensions. Of course, any filter assemblies comprising these filters should also be able to withstand mechanical loads (such as shock or vibration) during launch of a space vehicle including the filter assemblies.

Broadly speaking, filter assemblies according to the present disclosure use two or more (different) optical filters arranged in close proximity to each other so as to allow observation of different spectral bands at small footprint.

These filter assemblies should be suitable for being inserted between an optical lens (e.g., IR lens, or optics in general) and a (cover glass of a) focal plane array (FPA) of an optical system of, for example, a small satellite. Depending on implementations, only as little as, for example, 8.1 mm (in the thickness direction of the filter assembly) may be available for insertion of the filter assembly and potentially, of a shutter. This requires a very compact design of the filter assembly.

Moreover, filter assemblies according to the present disclosure should be able to withstand mechanical loads during launch of a space vehicle without sustaining damage to the optical filters. For example, filter assemblies according to the present disclosure may be able to withstand launch loads up to 16 GRMS (root-mean-square acceleration).

Figure 1:
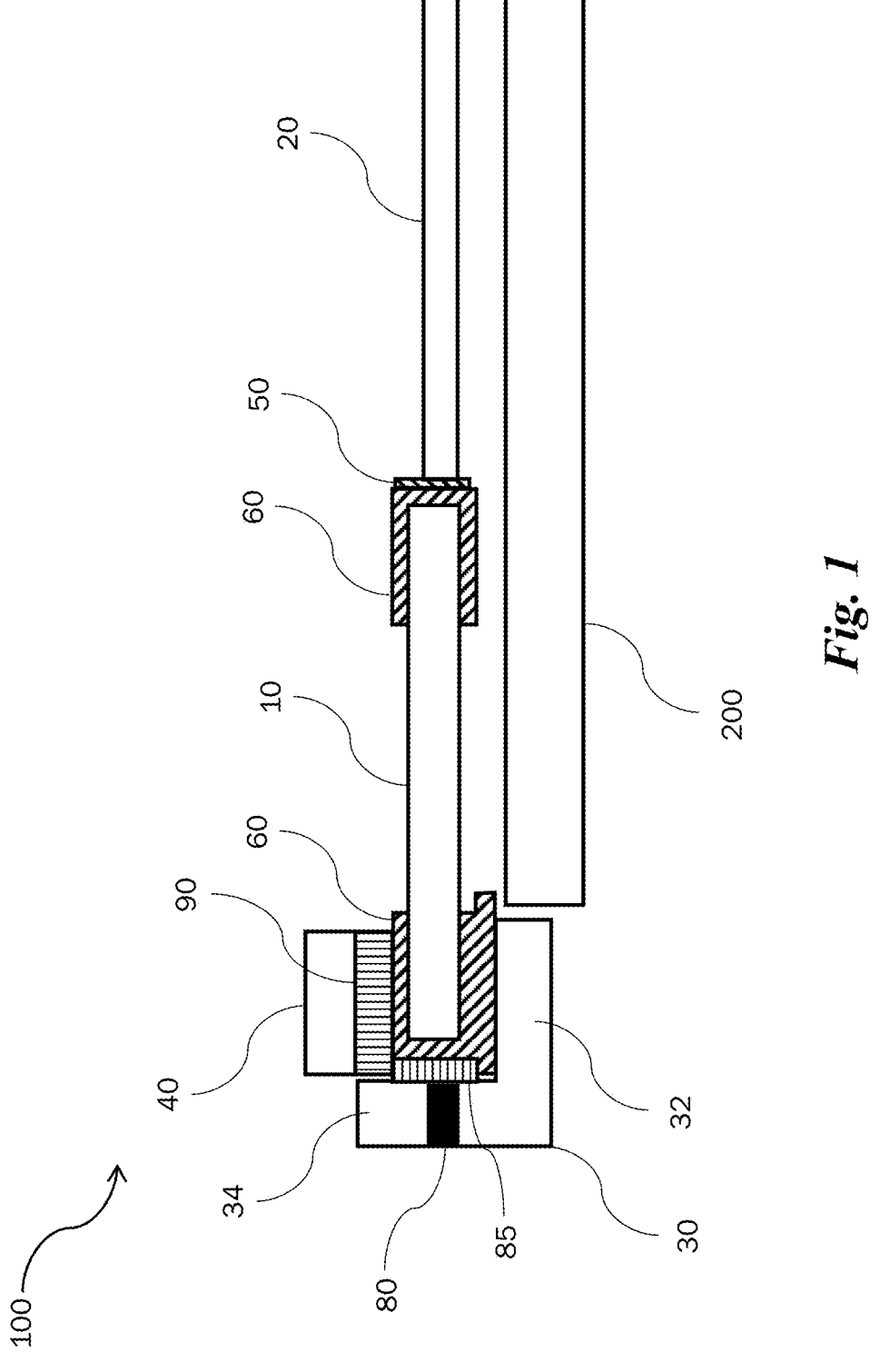
FIG. 1 is a schematic cut view of an example detail of a filter assembly according to embodiments of the disclosure.

FIG. 1 is a schematic cut view of an example detail of a filter assembly 100 according to embodiments of the disclosure. This filter assembly 100 is suitable for being provided in front of a (cover glass of a) focal plane array (FPA) 200 of an optical (e.g., IR) imaging system.

Two (different) optical filters, a first optical filter 10 and a second optical filter 20, are inserted/fit side by side into a frame or frame-shaped base part 30 (mount base part, or mount base, e.g., rectangular frame). In this configuration, with the first and second optical filters 10, 20 arranged side by side, one of the lateral surfaces of the first optical filter 10 extends in parallel to and faces one of the lateral surfaces of the second optical filter 20.

In some implementations, the filter assembly 100 may comprise more than two optical filters, with the necessary adaptations of the filter assembly readily apparent to the skilled person. Without intended limitation however, reference will be made throughout the present disclosure to (only) first and second optical filters 10, 20.

The first and second optical filters 10, 20 are preferably planar optical filters and may have rectangular shape. Further, the first and second optical filters 10, 20 are preferably optically transparent in respective infrared wavelength ranges. Being different optical filters, the pass-bands of the first and second optical filters 10, 20 are understood to not fully overlap. For example, the pass bands may not be overlapping at all. In one example, the first optical filter 10 may be a mid-wave infrared (MWIR) filter and the second optical filter 20 may be a long-wave infrared (LWIR) filter (or vice versa).

The frame-shaped base part 30 of the filter assembly 100 is a base part (frame, mount frame) for accommodating or holding the first and second optical filters 10, 20. To this end, it comprises a (planar) support part 32 for supporting edge portions of lower surfaces of the first and second optical filters 10, 20, as well as a wall part 34 for laterally enclosing at least part of the first and second optical filters 10, 20. When the first and second optical filters 10, 20 are inserted into the filter assembly 100, the base part 30 (specifically, the wall part 34 thereof) encloses (or in some cases, clamps) each filter on three lateral sides thereof.

In the present context, the base part 30 being "frame-shaped" means that the base part 30 (or more specifically, the support part 32) has an opening that is substantially surrounded by the support part 32. As can be seen from FIG. 1, the base part 30 may be dimensioned such that the opening in the support part 32 can accommodate the FPA 200. Thereby, a distance between the filter assembly 100 and the (cover glass of the) FPA 200 can be reduced. A typical distance that can be achieved in this manner may be 150 μm, for example. Since the first and second optical filters 10, 20 are supported by the support part 32 at their respective circumferential edges, this means that the first and second optical filters 10, 20 laterally extend beyond the (cover glass of the) FPA 200 in this case.

Figure 2:
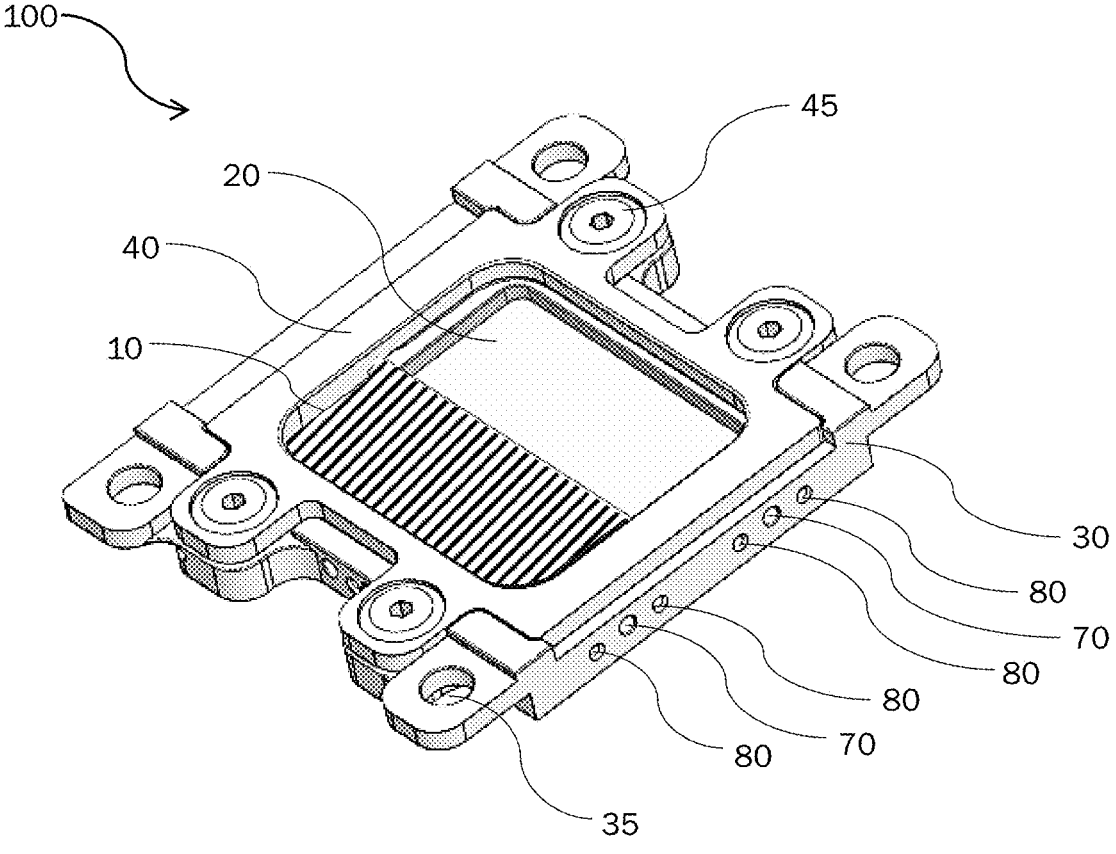
FIG. 2 is a schematic view of an example of a filter assembly according to embodiments of the disclosure.

The filter assembly 100 further comprises one or more clamp parts 40 for securing the first and second optical filters 10, 20 against the base part 30 when the first and second optical filters are inserted into the base part 30. In one example, the filter assembly 100 may include a (single, monolithic) frame-shaped clamp part, as illustrated in FIG. 2. In general, the clamp part(s) 40 secure the first and second optical filters 10, 20 by contacting upper surfaces of the first and second optical filters 10, 20 and by pressing the first and second optical filters 10, 20 towards the support part 32 of the base part 30. If provided as a single clamp part 40, said clamp part 40 may comprise a first pressing portion (e.g., planar pressing portion) for pressing the first optical filter 10 towards the support part 32 and a second pressing portion (e.g., planar pressing portion) for pressing the second optical filter 20 towards the support part 32. In other words, the one or more clamp parts 40 press the first and second optical filters 10,20 inserted into the base part 30 from above for fixation thereof. For fixation of the first and second optical filters 10, 20, the one or more clamp parts 40 may be fixable (e.g., releasably fixable) or otherwise securely attachable (e.g., releasably attachable) to the base part 30. Accordingly, the first and second optical filters 10, 20 are not attached to the base part 30 by glue, cement, or the like, but are releasably clamped by the one or more clamp parts 40. In fact, the aforementioned clamping may be sufficient for handling and testing of the filter assembly 100. Adding glue may only be necessary for a final flight model of the filter assembly 100.

The filter assembly 100 can accommodate optical filters of different thickness. That is, the first and second optical filters 10, 20 may have different thickness in a direction perpendicular to the upper (or lower) surfaces of the first and second optical filters 10, 20 (i.e., the vertical direction in FIG. 1, with the upper filter surfaces defining a horizontal plane). This may be achieved by foreseeing an appropriate shape of the one or more clamp parts 40. In other words, the one or more clamp parts 40 may be shaped to accommodate for different thickness of the first and second optical filters 10, 20. In the example of a (single, monolithic) frame-shaped clamp part, the first and second pressing portions of the frame-shaped clamp part may be offset from each other in a direction perpendicular to the upper (or lower) surfaces of the first and second optical filters 10, 20 (i.e., the vertical direction). This amounts to the frame-shaped clamp part having a gradation or stepping to compensate for different thickness of the first and second optical filters 10, 20. The support part 32 of the base part 30 on the other hand may be planar, so that it may be used universally, regardless of thickness of the first and second optical filters 10, 20.

To protect the first and second optical filters 10, 20 from sharp edges of the base part 30 and to avoid stress rupture of the first and second optical filters 10, 20 due to formation of dents or notches, the filter assembly 100 may further comprise a Polyimide layer 60 (e.g., Polyimide film or Polyimide tape, such as Kapton® tape from DuPont de Nemours, Inc., for example) covering the relevant surfaces of the first and second optical filters 10, 20. For instance, the Polyimide layer 60 may cover those portions of the lower surfaces of the first and/or second optical filters 10, 20 that are (or that would otherwise be) in contact with the base part 30 (i.e., the support part 32 or the wall part 34) and/or those portions of the upper surfaces of the first and/or second optical filters 10, 20 that are (or that would otherwise be) in contact with the one or more clamp parts 40. In such configurations, the Polyimide layer 60 may be provided on the relevant filter surface and/or on the relevant surface of the base part 30 or the clamp part(s) 40.

Additionally or alternatively, the Polyimide layer 60 may cover one (or both) of the facing lateral surfaces of the first and second optical filters 10, 20. In the example of FIG. 1, the Polyimide layer 60 covers the lateral surfaces of the first optical filter 10, as well as edge portions of the upper and lower surfaces of the first optical filter 10. Additionally or alternatively, the Polyimide layer 60 may also cover the lateral surfaces of the second optical filter 20, as well as edge portions of the upper and lower surfaces of the second optical filter 20. That is, in general, the Polyimide layer 60 may cover (at least) those lateral surfaces of the first and/or second optical filters 10, 20 that are adjacent to portions of the wall part 34 of the base part 30.

Preferably, the Polyimide layer 60 avoids (e.g., substantially avoids) the optically active areas of the first and second optical filters 10, 20, for example those areas of the first and second optical filters 10, 20 that are not obstructed by the base part 30 or the one or more clamp parts 40. This may not always be possible for the area(s) adjacent to the facing lateral surfaces of the first and second optical filters 10, 20 (i.e., in the middle of the filter assembly 100 where the first and second optical filters 10, 20 meet).

To be able to compensate for thermal expansion of the first and second optical filters 10, 20 and/or the base part 30, the first and second optical filters 10, 20 may be floating in the base part 30, i.e., there may be floating support of the first and second optical filters 10, 20. This allows for relative movement of the first and second optical filters 10, 20 relative to the base part 30, thereby compensating for, for example, the base part's 30 thermal expansion.

To facilitate relative movement, the relevant surfaces of the first and/or second optical filters 10, 20 may be covered by a grease film 50. For example, the filter assembly 100 may comprise a grease film 50 provided between the facing lateral surfaces of the first and second optical filters 10, 20. Additionally or alternatively, the grease film 50 may also be provided on those portions of the lower surfaces of the first and/or second optical filters 10, 20 that are (or that otherwise would be) in contact with the base part 30 (e.g., the support part 32 thereof). If the Polyimide film 60 is present on respective filter surfaces, the grease film 50 may be provided on top of the Polyimide film 60. If the filter assembly is intended for space applications, the grease film should preferably be composed of grease suitable for vacuum. In particular, the grease used for the grease film may not be outgassing.

Additional fastening and vibration damping may be provided by adding a Polytetrafluoroethylene, PTFE, layer to the design. This PTFE layer may relate to a PTFE film or PTFE tape, such as a (self-adhesive) PTFE damper, for example. Accordingly, the filter assembly 100 may further comprise a PTFE layer 90 covering at least those parts of the upper surfaces of the first and second optical filters 10, 20 that are contacted (or that would otherwise be contacted) by the one or more clamp parts 40. For example, the PTFE layer 90 may cover those edge parts of the upper surfaces of the first and second optical filters that are adjacent to the wall part and that would thus be contacted by the one or more clamp parts 40.

Figure 3:
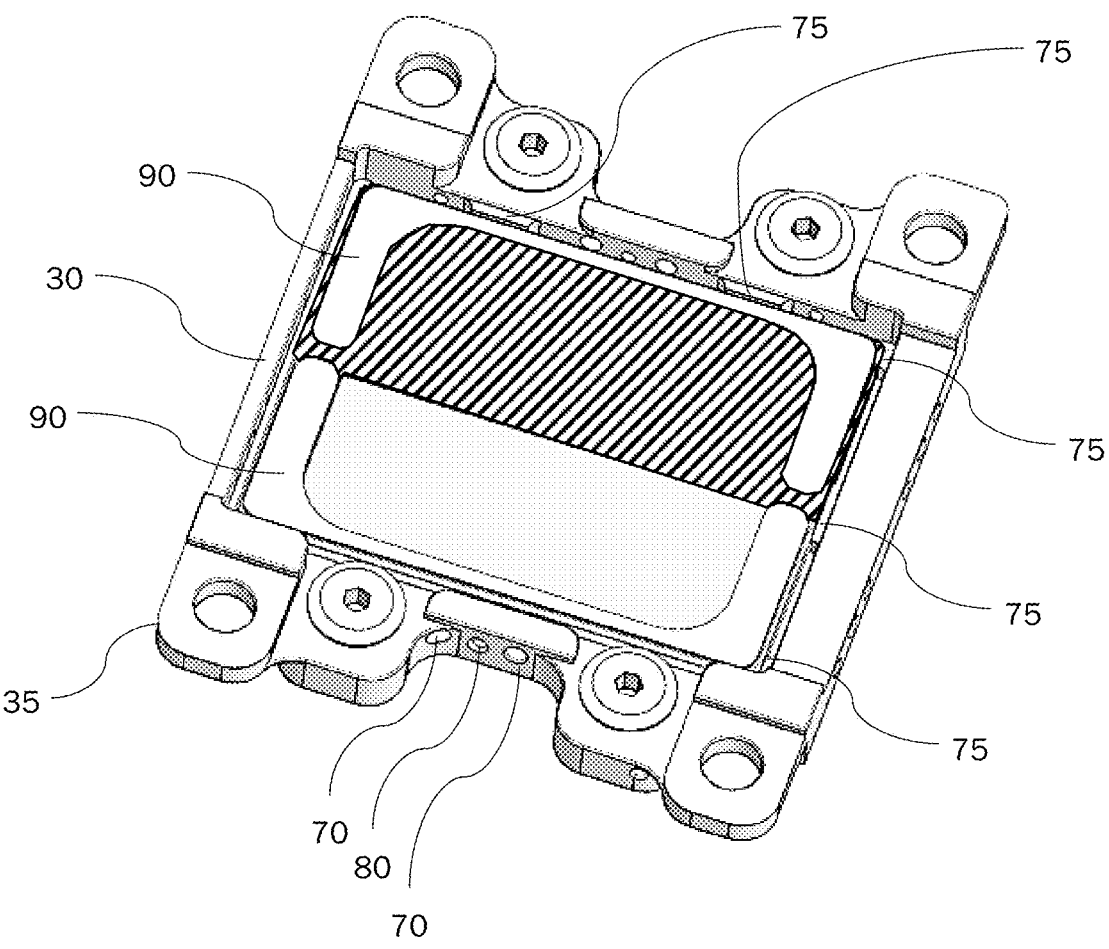
FIG. 3 is another schematic view of an example of a filter assembly according to embodiments of the disclosure.

FIG. 2 and FIG. 3 are perspective views of an example of a filter assembly 100 according to embodiments of the disclosure, in line with the above. FIG. 2 shows the case of the filter assembly 100 with a single clamp part 40 attached to the base part 30, whereas in FIG. 3 the clamp part 40 is omitted.

As can be seen from these figures, the base part 30, or more specifically, the wall part 34 thereof, comprises a plurality of through holes. In detail, the wall part 34 comprises one or more first through holes 70 and/or one or more second through holes 80. In other words, the first and/or second through holes 70, 80 are arranged in the sides of the base part 30. These through holes may be (substantially) horizontal through holes, for example.

The second through holes 80 will be described first. The second through holes 80 are (small) holes for insertion of silicon glue 85 (see FIG. 1). Each of the second through holes 80 is provided in a respective portion of the wall part 34 and allows for insertion of silicon glue 85 into a clearance formed between the one of the first and second optical filters 10, 20 that faces the respective second through hole 80 and the respective portion of the wall part 34. The silicon glue 85 is primarily intended to provide for additional damping (vibration damping) and additional fastening, whereas the actual (main) fixation of the first and second optical filters 10, 20 is achieved by being clamped between the one or more clamp part 40 and the base part 30.

In the example of FIG. 2 and FIG. 3, the base part (frame) 30 is substantially rectangular (e.g., rectangular). In this case, all four sides of the four sides of the base part 30 may have second through holes 80 for glue insertion. In general, the second through holes 80 may be provided on the sides of the base part 30 such that the first and second optical filters 10, 20 can be additionally secured by silicon glue 85 along their lateral surfaces that face the wall part 34.

Before inserting the silicon glue 85 via the first through holes 80, it may be desirable to accurately position the first and/or second optical filters 10, 20 within the base part 30.

To this end, first through holes 70 as mentioned above, and optionally, end stops 75 may be provided in the base part 30.

The first through holes 70 are through holes each of sufficient diameter for insertion of a positioning rod (not shown). By insertion of the positioning rod through respective first through holes 70, the one of the first and second optical filters 10, 20 that faces the respective first through hole 70 can be pressed or moved away from the respective first through hole 70, towards a portion of the wall part 34 opposite the respective first through hole 70.

As was the case for the second through holes 80, also the first through holes 70 may be provided on all four sides of the rectangular base part 30. In one example, the first through holes 80 may be provided (at least) in two non-opposite lateral sides of the base part 30. In any case, the first through holes 70 may be provided such that position adjustment of the first and second optical filters 10, 20 in two directions in the filter plane is possible.

For more accurate positioning, the filter assembly 100 may further comprise one or more end stops 75 arranged at a portion (or respective portions) of the wall part 34 opposite the one or more first through holes 70. These end stops 75 may serve for defining a clearance between the portion of the wall part 34 opposite the one or more first through holes 70 and the one of the first and second optical filters 10, 20 that faces said portion of the wall part 34. Therein, the first through holes 70 and the end stops 75 may not necessarily have to be in a one-to-one relationship. It may be sufficient that the end stops 75 are provided such as to ensure a well-defined position of the first and/or second optical filters 10, 20 when the first and/or second optical filters 10, 20 are pressed by the positioning rod(s) via respective first through holes 70.

For a rectangular base part 30, (at least) two non-adjacent sides of the four sides of the base part 30 may have first through holes 70 and the two remaining sides may have end stops 75. Alternatively, all sides may have first through holes 70 and end stops 75, to allow for increased flexibility in positioning the first and second optical filters 10, 20.

Thus, according to the present disclosure means for accurate positioning (i.e., the first through holes 70 and/or end stops 75) as well as means allowing additional fixation or damping (i.e., the second through holes 80) may be integrated with the frame structure (i.e., the base part 30) of the filter assembly 100, leading to a particularly simply design.

For securing the one or more clamp parts 40 (one clamp part 40 in the example of FIG. 2 and FIG. 3) against the base part 30, the one or more clamp parts 40 may comprise (vertical) through holes 45. For example, the one or more clamp parts 40 may be secured to the base part 30 by screws or bolts (e.g., riveted bolts), via the through holes 45. These through holes may extend in a direction substantially perpendicular to the upper (or lower) surfaces of the first and second optical filters 10, 20 (i.e., the vertical direction).

In general, the one or more clamp parts 40 may be securable to the base part 30, by appropriate means, in a releasable manner, so that the first and second optical filters 10, 20 may be securely held, but also so that the filter assembly 100 can be opened to replace or rearrange the optical filters. One example of such releasable securing may be by screws, as described above.

For securing the base part 30 against an external structure (such as a frame, mount, or suitable interface of a satellite, for example), the base part 30 may comprise one or more fixation parts 35. The fixation parts may comprise through holes extending in a direction substantially perpendicular to the upper surfaces of the first and second optical filters 10, 20 (i.e., the vertical direction). These fixation parts may be used for securing the base part 30 against the external structure by screws or bolts (e.g., riveted bolts), for example.

To make the filter assembly 100 suitable for applications in space, the materials used for the filter assembly 100 may feature little or no outgassing. This applies, mainly, to the silicon glue 85 and the grease used for the grease film 50, but may also apply to the Polyimide layer 60 and/or the PTFE layer 90. The outgassing characteristics of the materials used may be examined and tested, for example, in a thermal vacuum chamber. The base part 30 and/or the one or more clamp parts 40 may be made from aluminum. For example, the base part 30 and the one or more clamp part 40 may be milled from the solid.

Configured as described above with reference to FIG. 1, FIG. 2, and FIG. 3, the filter assembly 100 provides a cost-effective solution for making observations in two or more different spectral bands, for example in the IR range. Specifically, the filter assembly 100 allows for use of off-the-shelf optical filters that can be cut into shape and inserted into the base part 30. The proposed design moreover is compact and allows for easy adaptation to boundary conditions including filter sizes, filter number, and available volume/footprint. By holding the optical filters in place primarily by releasable clamping instead of, for example, gluing or by using cement, the proposed filter assembly 100 allows for adaptations and filter replacement after initial finalization.

Figure 4:
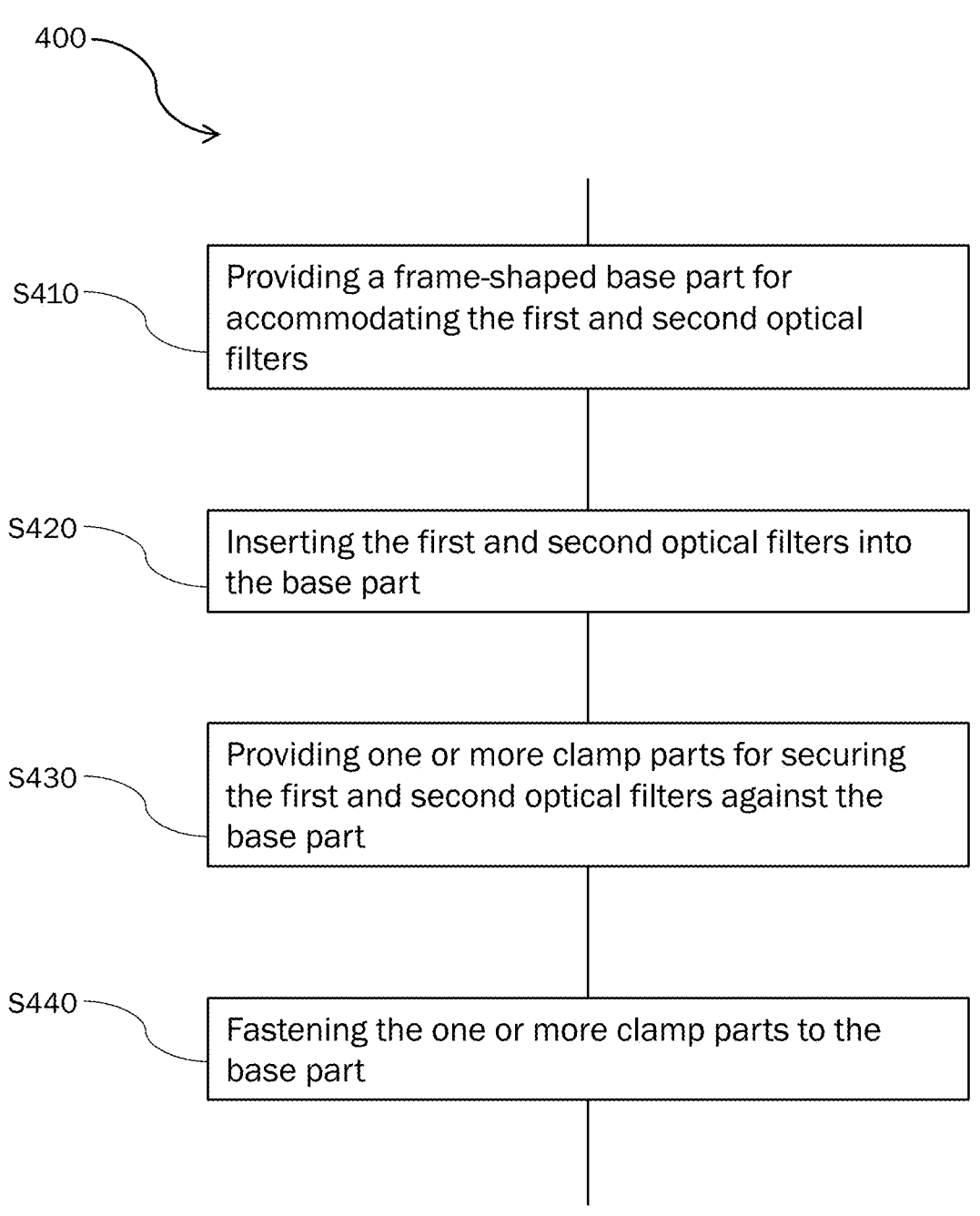
FIG. 4 is a flowchart schematically illustrating an example method of manufacturing a filter assembly according to embodiments of the disclosure.

FIG. 4 is a flowchart schematically illustrating an example of a method 400 of manufacturing a filter assembly according to embodiments of the disclosure. This filter assembly is understood to comprise a (planar) first optical filter and a (planar) second optical filter, as described above. It is further understood that performing method 400 may yield the filter assembly 100 described above with reference to FIG. 1 to FIG. 3. As shown in the flowchart, method 400 comprises steps S410 through S440, but may additionally comprise optional steps as set out further below.

At step S410, a frame-shaped base part is provided for accommodating the first and second optical filters. This base part comprises a support part for supporting edge portions of lower surfaces of the first and second optical filters, and a wall part for laterally enclosing at least part of the first and second optical filters.

At step S420, the first and second optical filters are inserted (e.g., laid in) into the base part.

At step S430, one or more clamp parts are provided for securing (e.g., releasably securing) the first and second optical filters against the base part, by contacting upper surfaces of the first and second optical filters and pressing the first and second optical filters towards the support part.

At step S440, the one or more clamp parts are fastened (e.g., releasably fastened) to the base part.

Method 400 can further include any, some, or all of the following optional steps (not shown in FIG. 4).

For example, the method may include, before inserting the first and second optical filters into the base part, (a step of) covering a portion of the first and/or second optical filters with a Polyimide film or layer. Alternatively or additionally, the method may comprise (a step of) covering a portion of the base part with a Polyimide film or layer. It is understood that this step or these steps will yield a configuration of the Polyimide layer as described above with reference to FIG. 1.

For example, the method may further include, before inserting the first and second optical filters into the base part, (a step of) covering a portion of the first and/or second optical filters with a grease film or layer. It is understood that this step will yield a configuration of the grease film as described above with reference to FIG. 1.

For example, the method may further include (a step of) covering a portion of the one or more clamp parts with a PTFE film or layer. It is understood that this step will yield a configuration of the PTFE layer as described above with reference to FIG. 1.

For example, the method may further include, after fastening the one or more clamp parts to the base part, (a step of) inserting silicon glue into a clearance formed between the first and second optical filters and a wall part of the base part, via through holes formed in the wall part. It is understood that this step will yield a configuration of the silicon glue as described above.

As another example, the method may further include, after fastening the one or more clamp parts to the base part and before inserting silicon glue, (a step of) positioning the first and/or second optical filters using a positioning rod, via through holes in a wall part of the base part, possibly by pushing the first and/or second optical filters against respective end stops, as described above. In some implementations, screws holding the one or more clamp parts may not be fully tightened at first to allow for some movement of the first and/or second optical filters for final positioning, and may be fully tightened after final positioning of the first and/or second optical filters has been achieved.

It should be noted that the description and drawings merely illustrate the principles of the proposed filter assembly and manufacturing method. Those skilled in the art will be able to implement various arrangements that, although not explicitly described or shown herein, embody the principles of the disclosure and are included within its spirit and scope. Furthermore, all examples and embodiment outlined in the present disclosure are principally intended expressly to be only for explanatory purposes to help the reader in understanding the principles of the proposed method and device. Furthermore, all statements herein providing principles, aspects, and embodiments of the disclosure, as well as specific examples thereof, are intended to encompass equivalents thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A filter assembly, comprising:
at least two planar optical filters including a first optical filter and a second optical filter;
a frame-shaped base part for accommodating the first and second optical filters having lateral surfaces, wherein the frame-shaped base part comprises a planar support part for supporting edge portions of lower surfaces of the first and second optical filters, and a wall part for laterally enclosing at least part of the first and second optical filters; and
a frame-shaped clamp part releasably fixable to the frame-shaped base part for securing the first and second optical filters against the base part when the first and second optical filters are inserted into the frame-shaped base part, by contacting upper surfaces of the first and second optical filters and pressing the first and second optical filters towards the support part, wherein:

the frame-shaped clamp part comprises a first pressing portion for pressing the first optical filter towards the support part and a second pressing portion for pressing the second optical filter towards the support part; and the first and second pressing portions of the frame-shaped clamp part are offset from each other in a direction perpendicular to the upper or lower surfaces of the first and second optical filters so as to allow the frame-shaped clamp part for accommodating different thickness of the first and second optical filters.

2. The filter assembly according to claim 1, wherein the first and second optical filters are inserted into the frame-shaped base part side by side, with one of the lateral surfaces of the first optical filter extending in parallel to and facing one of the lateral surfaces of the second optical filter.

3. The filter assembly according to claim 2, further comprising a grease film provided between the facing lateral surfaces of the first and second optical filters.

4. The filter assembly according to claim 2, further comprising a Polyimide layer covering one of the facing lateral surfaces of the first and second optical filters.

5. The filter assembly according to claim 1, wherein the wall part comprises one or more first through holes, each first through hole allowing for insertion of a positioning rod, for pressing one of the first and second optical filters that faces a respective first through hole towards a portion of the wall part opposite the respective first through hole.

6. The filter assembly according to claim 5, further comprising one or more end stops arranged at a portion of the wall part opposite the one or more first through holes, for defining a clearance between the portion of the wall part opposite the one or more first through holes and one of the first and second optical filters that faces said portion of the wall part.

7. The filter assembly according to claim 1, wherein the wall part comprises a second through hole, the second through hole allowing insertion of silicon glue into a clearance formed between one of the first and second optical filters that faces the second through hole and a portion of the wall part.

8. The filter assembly according to claim 1, further comprising a Polytetrafluoroethylene, PTFE, layer covering at least those parts of the upper surfaces of the first and second optical filters that are contacted by the frame-shaped clamp part.

9. The filter assembly according to claim 1, further comprising a Polyimide layer covering at least those lateral surfaces of the first and second optical filters that are adjacent to portions of the wall part.

10. The filter assembly according to claim 1, wherein the first and second optical filters are optically transparent in respective infrared wavelength ranges.

11. The filter assembly according to claim 1, wherein the frame-shaped clamp part comprises through holes for securing the frame-shaped clamp part against the frame-shaped base part by screws or bolts.

12. The filter assembly according to claim 1, wherein the frame-shaped base part further comprises one or more fixation parts for securing the frame-shaped base part against an external structure.

13. A method of manufacturing a filter assembly comprising at least two planar optical filters including a first optical filter and a second optical filter, the method comprising:

providing a frame-shaped base part for accommodating the first and second optical filters, wherein the frame-shaped base part comprises a planar support part for supporting edge portions of lower surfaces of the first and second optical filters, and a wall part for laterally enclosing at least part of the first and second optical filters;

inserting the first and second optical filters into the frame-shaped base part;

providing a frame-shaped clamp part releasably fixable to the frame- shaped base part for securing the first and second optical filters against the frame-shaped base part, by contacting upper surfaces of the first and second optical filters and pressing the first and second optical filters towards the support part; and fastening the frame-shaped clamp part to the frame-shaped base part, wherein:

the frame-shaped clamp part comprises a first pressing portion for pressing the first optical filter towards the support part and a second pressing portion for pressing the second optical filter towards the support part; and the first and second pressing portions of the frame-shaped clamp part are offset from each other in a direction perpendicular to the upper or lower surfaces of the first and second optical filters so as to allow the frame-shaped clamp part for accommodating different thicknesses of the first and second optical filters.

14. The method of manufacturing a filter assembly according to claim 13, wherein the first and second optical filters are inserted into the frame-shaped base part side by side, with a lateral surface of the first optical filter extending in parallel to and facing a lateral surface of the second optical filter.

15. The method of manufacturing a filter assembly according to claim 13, further comprising inserting a positioning rod through a respective first through hole of one or more first through holes defined in the wall part to press one of the first and second optical filters that faces the respective first through hole towards a portion of the wall part opposite the respective first through hole.

16. The method of manufacturing a filter assembly according to claim 15, further comprising arranging one or more end stops at a portion of the wall part opposite the one or more first through holes, to define a clearance between the portion of the wall part opposite the one or more first through holes and one of the first and second optical filters that faces said portion of the wall part.

17. The method of manufacturing a filter assembly according to claim 13, wherein the wall part comprises a second through hole, the method further comprising inserting silicon glue through the second through hole into a clearance formed between one of the first and second optical filters that faces a respective the second through hole and a portion of the wall part.

* * * * *